United States Patent [19]

Taylor

[11] Patent Number: 5,054,717
[45] Date of Patent: Oct. 8, 1991

[54] AIRCRAFT CAPTURE SYSTEMS

[75] Inventor: Douglas R. Taylor, Cliftonville, England

[73] Assignee: GEC Marconi Limited, England

[21] Appl. No.: 509,604

[22] Filed: Apr. 16, 1990

[30] Foreign Application Priority Data

May 3, 1989 [GB] United Kingdom ............... 8910108

[51] Int. Cl.$^5$ ............................................. B64C 25/68
[52] U.S. Cl. ............................ 244/110 F; 244/110 R
[58] Field of Search .......... 244/110 F, 110 R, 114 R, 244/115, 116; 258/1.2, 1.8, 11–26; 114/258, 261, 262

[56] References Cited

U.S. PATENT DOCUMENTS

| | | | |
|---|---|---|---|
| 584,152 | 6/1897 | Campbell | 258/15 |
| 614,756 | 11/1898 | Perkins | 258/17 |
| 835,404 | 11/1906 | Cramer | 258/23 |
| 880,609 | 3/1908 | Watts | 258/21 |
| 991,838 | 5/1911 | Feist | 258/11 |
| 1,056,449 | 3/1913 | Ponton | 258/20 |
| 1,084,579 | 1/1914 | Jenkins | 258/14 |
| 1,224,433 | 5/1917 | West | 258/18 |
| 4,311,290 | 1/1982 | Koper | 244/110 R |

FOREIGN PATENT DOCUMENTS 2080216  2/1982 United Kingdom .
2219777 12/1989 United Kingdom .

Primary Examiner—Joseph F. Peters, Jr.
Assistant Examiner—Anne E. Bidwell
Attorney, Agent, or Firm—Kirschstein, Ottinger, Israel & Schiffmiller

[57] ABSTRACT

An aircraft capture system, e.g. for a radio-controlled pilotless aircraft (19), having at the homing station a boom arrangement (13) mounted for rotation about a vertical hinge axis (A—A) and having appreciable flexibility under forces acting perpendicular to the hinge axis while being substantially inflexible under forces acting parallel to the hinge axis. The flexibility of the boom arrangement cushions the aircraft against shock when an arrester hook (33) deployed from the aircraft engages the boom arrangement via an arrester wire (15) attached to the boom arrangement.

7 Claims, 2 Drawing Sheets

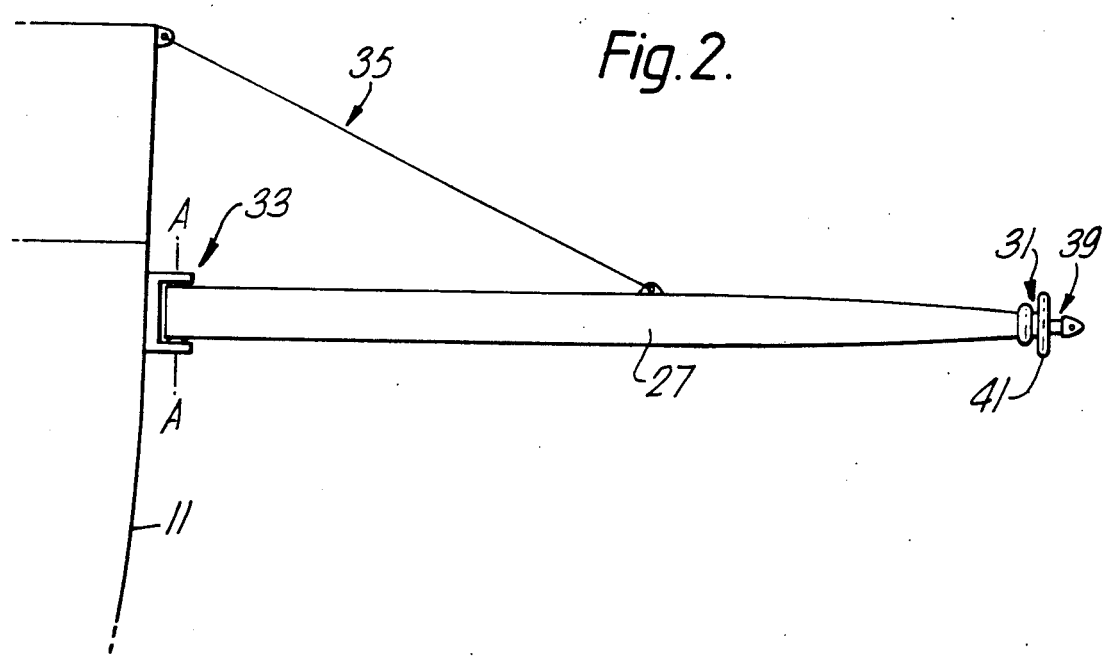
Fig. 2.
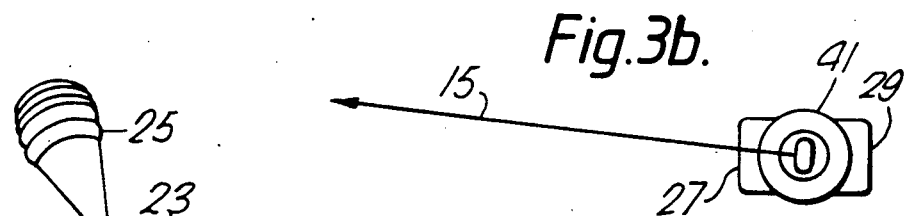
Fig. 3b.
Fig. 3a.
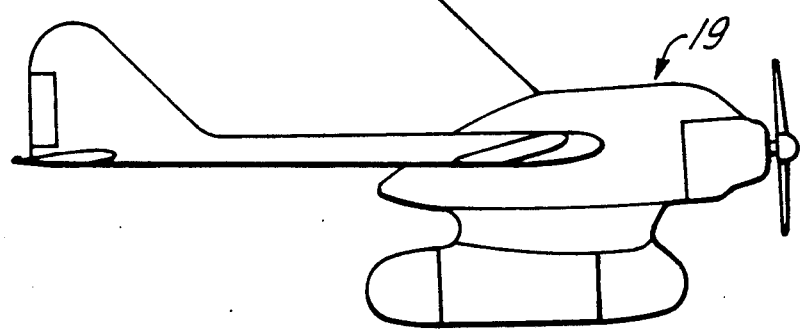

AIRCRAFT CAPTURE SYSTEMS

BACKGROUND OF THE INVENTION

This invention relates to aircraft capture systems and is especially, though not exclusively, concerned with the capture at sea of pilotless aircraft.

DESCRIPTION OF RELATED ART

Such systems typically comprise: a homing station at which an aircraft is captured; an elongate boom arrangement at the homing station mounted for pivotal movement about a substantially vertical hinge axis; a first elongate flexible arrester member connected at one end to the said boom arrangement at a position spaced from said hinge axis; energy absorber means at the homing station connected to the other end of said first arrester member; a second elongate flexible arrester member connected at one end to the aircraft; arrester hook means attached to said second arrester member at a position spaced from said one end of said second arrester member; and aerodynamic lift means operable when deployed, with the aircraft in flight, to support said second arrester means by aerodynamic lift action.

Such a system is hereinafter referred to as an aircraft capture system of the kind specified.

In operation of an aircraft capture system of the kind specified an aircraft to be captured is directed in flight so that the arrester hook means engages the first arrester member. The aircraft is then rapidly retarded by the combined action of the energy absorber means and the force required to swing the boom arrangement about its hinge axis.

One difficulty experienced in operation is that the inertia of the boom arrangement is such that retarding force may increase unduly sharply as the boom arrangement begins to move, with possible resultant damage to the aircraft or capture system.

SUMMARY OF THE INVENTION

It is an object of the present invention to provide an aircraft capture system wherein this difficulty is alleviated.

According to the present invention in an aircraft capture system of the kind specified said boom arrangement is appreciably flexible under forces applied thereto in a direction substantially perpendicular to the hinge axis whilst being substantially inflexible under forces applied thereto in a direction parallel to the hinge axis.

In a preferred arrangement said boom arrangement is appreciably flexible under forces applied thereto in a direction substantially perpendicular to said hinge axis in the direction of the length of the boom arrangement and is substantially inflexible under forces applied thereto in a direction substantially perpendicular to said hinge axis at right angles to the length of the boom arrangement.

In one such preferred arrangement the boom arrangement comprises first and second confronting oppositely curved boom members convergent towards their ends to define end junctions, the inboard end junction being located at said vertical hinge axis and each said boom member being thicker in a direction parallel to the hinge axis than in the orthogonal direction.

Conveniently, at the outboard end junction of the convergent boom members there is a swivel attachment having a swivel axis parallel to the length of the boom arrangement and the first arrester member is connected at said one end to the said swivel attachment.

The invention finds particular application where the homing station is in a marine environment.

BRIEF DESCRIPTION OF THE DRAWINGS

One aircraft capture system in accordance with the invention will now be described, by way of example, with reference to the accompanying drawings in which:

FIG. 2 is a diagram showing the ship-borne boom arrangement from the direction of approach of an aircraft to be captured; and FIGS. 3a and 3b are diagrams illustrating details of parts of the system.

DETAILED DESCRIPTION OF THE PREFERRED EMBODIMENT

Figure 1:
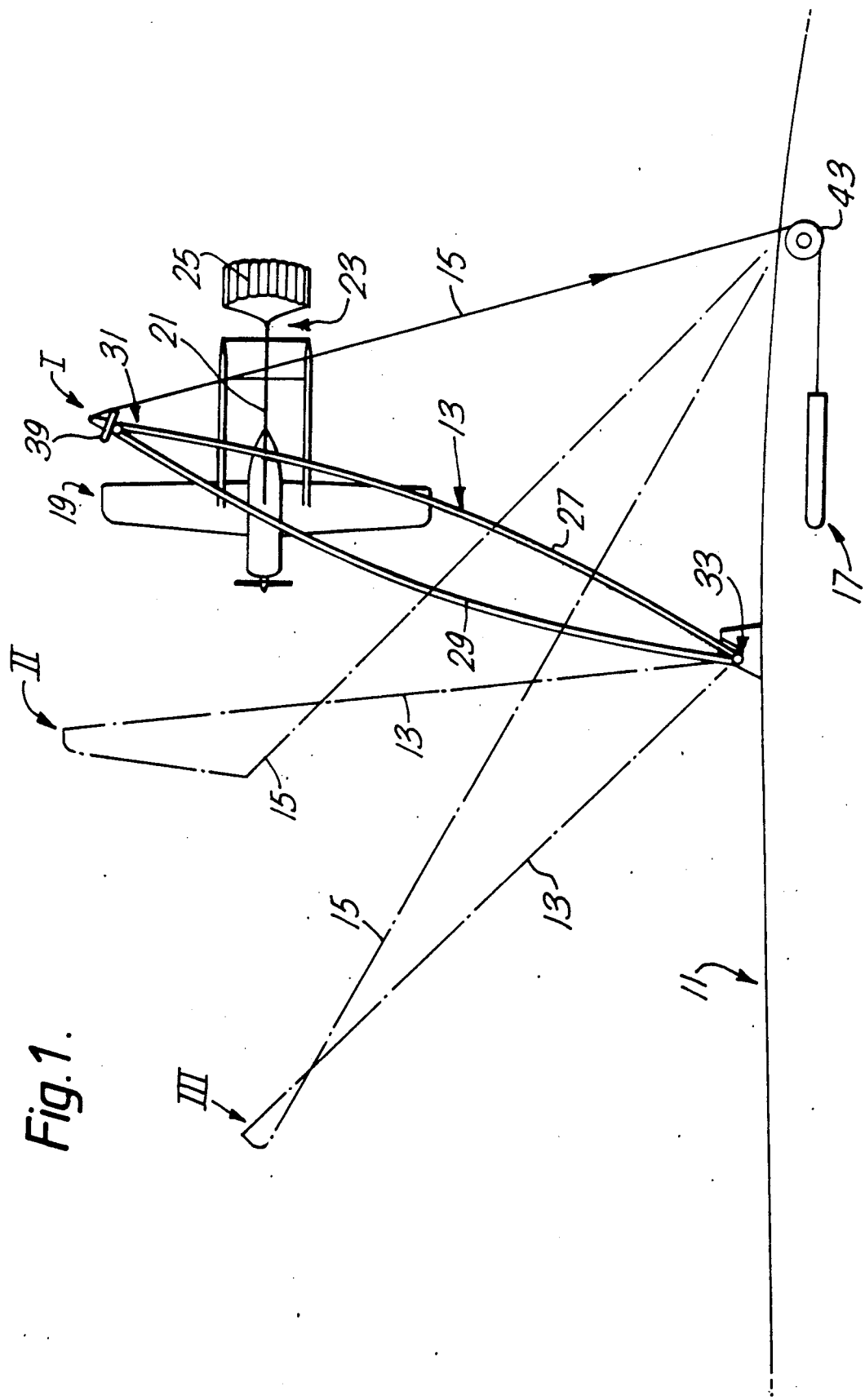
FIG. 1 is a diagrammatic plan view of the system.

Referring to the drawings, the capture system is for use on a ship 11 and includes: associated with the ship 11, a boom arrangement 13, a first elongate flexible arrester wire 15, and an energy absorber means 17, and associated with an aircraft 19 to be captured, being in this example a pilotless aircraft, a second elongate flexible arrester wire 21, latch hook means 23 and an aerodynamic lift means 25.

The boom arrangement 13 which extends laterally outboard of the ship 11 is mounted on the ship 11 for pivotal movement about a vertical hinge axis A—A.

The boom arrangement comprises first and second confronting oppositely curved boom members 27 and 29 respectively which converge at their ends to define end junctions 31 and 33 respectively, the inboard junction 33 being located at the vertical hinge axis A—A. Boom guys 35 (see FIG. 2 only) extend between the boom members 27, 29 and the ship's side to support the boom arrangement 13 for pivotal movement about the hinge axis A—A. In the drawing only one such guy 35 is shown for clarity.

The boom members 27 and 29 are each much thicker in the direction parallel to the hinge axis A—A than in the orthogonal direction. As a result, the boom arrangement 13 is substantially inflexible to vertical forces whilst having an appreciable flexibility to forces in the direction of its length.

Attached to the outboard junction 31 of the boom arrangement 13 there is a swivel means 39 which has its swivel axis parallel to the direction of the length of the boom arrangement 13. A collar 41 surrounds the swivelling part of the swivel means 39.

The energy absorbing means 17 (omitted in FIG. 2 for clarity) comprises a hydraulic damper mechanism mounted on the ship and has its movable part attached to an end of the arrester wire 15 (see FIG. 1). The arrester wire 15 extends around a sheave or pulley 43 and is attached at its end remote from the damper 17 to the swivel means 39.

The second arrester wire 21 is attached at one end to a frame part of the aircraft 19 and at the other to the latch hook means 23. The aerodynamic lift means 25, which comprises a parasail, is attached to the hook means 23.

When the aircraft 19 is to be captured the parasail 25 is released from stowage within the aircraft 19 by remote command from the ship 11 and after release opens, lifting the arrester wire 21 and hook means 23 above the aircraft 19. The parasail 25 then flies at a constant position above and behind the aircraft 19.

The aircraft 19 is directed by remote command from the ship 11 along a course such that it flies under the boom arrangement 13 a few feet inboard of the end of the boom.

In the course of such directed flight the arrester 21 encounters the arrester wire 15 (see FIG. 1). Further movement of the aircraft 19 causes the hook means 23 to be drawn downwards progressively to engagement with the wire 15. Thereafter the aircraft 19 pulls on the wire 15 against the viscous drag of the hydraulic damper 17 and the force required to cause the boom arrangement 13 to swing forward about its hinge axis A—A.

The maximum retardation force applied to the aircraft 19 is reduced by virtue of the flexibility of the boom arrangement 13 in the direction of its length. Typically the maximum retardation arises just as the boom arrangement 13 starts to swing due to the relatively large inertia of the boom arrangement 13. Thus, the flexibility of the boom arrangement 13 has a cushioning effect against sharp increases in the retardation force on the aircraft due particularly to the inertia of the boom arrangement.

It will be appreciated that whilst in the particular system described by way of example the boom arrangement is relatively flexible under forces applied in the direction of its length only, in other systems in accordance with the invention the boom arrangement may alternatively or additionally be flexible under forces applied in other directions perpendicular to the hinge axis, i.e. in other directions in the plane of movement of the boom arrangement about its hinge axis. However, in general flexibility under forces applied in the direction of the length of the boom arrangement only is found to be most desirable from the point of view of stability. It will be understood in this connection that substantial inflexibility to forces applied in the direction of the hinge axis is necessary so that the boom arrangement adequately supports the aircraft when captured.

I claim:

1. An aircraft capture system comprising: a homing station at which an aircraft is captured; an elongate boom arrangement at the homing station mounted for pivotal movement about a substantially vertical hinge axis; a first elongate flexible arrester member connected at one end to said boom arrangement at a position spaced from said hinge axis; energy absorber means at the homing station connected to the other end of said first arrester member; a second elongate flexible arrester member connected at one end to the aircraft; arrester hook means attached to said second arrester member at a position spaced from said one end of said second arrester member; and aerodynamic lift means operable when deployed, with the aircraft in flight, to support said second arrester means by aerodynamic lift action; said boom arrangement being appreciably flexible under forces applied thereto in a direction substantially perpendicular to the hinge axis whilst being substantially inflexible under forces applied thereto in a direction parallel to the hinge axis.

2. A system according to claim 1 wherein said boom arrangement is appreciably flexible under forces applied thereto in a direction substantially perpendicular to said hinge axis in the direction of the length of the boom arrangement.

3. A system according to claim 2 wherein said boom arrangement is substantially inflexible under forces applied thereto in a direction substantially perpendicular to said hinge axis at right angles to the length of the boom arrangement.

4. A system according to claim 3 wherein the boom arrangement comprises first and second confronting oppositely curved boom members convergent towards their ends to define end junctions, the inboard end junction being located at said vertical hinge axis and each said boom member being thicker in a direction parallel to the hinge axis than in an orthogonal direction.

5. A system according to claim 4 wherein at the outboard end junction of the convergent boom members there is a swivel attachment having a swivel axis parallel to the length of the boom arrangement and the first arrester member is connected at said one end to said swivel attachment.

6. A system according to claim 1 wherein said first and second arrester members comprise wires.

7. A system according to claim 1 wherein said energy absorber means is a hydraulic damper mechanism.

* * * * *